Mar. 3, 1925.

S. F. WALTON 1,528,351

COAL RETORT LINING

Filed July 11, 1921

Inventor:
Samuel F. Walton
by Roberts, Roberts & Cushman
his Attys.

Patented Mar. 3, 1925.

1,528,351

UNITED STATES PATENT OFFICE.

SAMUEL F. WALTON, OF BOSTON, MASSACHUSETTS, ASSIGNOR, BY MESNE ASSIGNMENTS, TO INTERNATIONAL COAL PRODUCTS CORPORATION, A CORPORATION OF VIRGINIA.

COAL-RETORT LINING.

Application filed July 11, 1921. Serial No. 483,743.

*To all whom it may concern:*

Be it known that I, SAMUEL F. WALTON, a citizen of the United States of America, and resident of Boston, in the county of Suffolk and State of Massachusetts, have invented new and useful Improvements in Coal Retort Linings, of which the following is a specification.

This invention relates to retorts and more particularly to a lining for such retorts made of silicon carbide (commonly designated in the trade as carborundum, carbon, crystalon, etc.) The lining is applicable either to continuous or non-continuous retorts, that is, either retorts in which the coal is fed through continuously or retorts in which the coal is charged and fired, and the residue removed before recharging, but it is particularly applicable to continuous retorts.

While silicon carbide possesses characteristics which are uniquely desirable in retort linings the use of the material for this purpose has never been satisfactory. For example, in continuous retorts where the coal is fed through by means of a screw or equivalent means the outward pressure exerted on the walls frequently breaks silicon carbide linings as heretofore constructed, which linings ordinarily have a cross-breaking strength or modulus of rupture of 2000 to 2200 pounds per square inch or less at 1000° C. Moreover, prior silicon carbide linings have been susceptible to the action of the vapors or gases reduced in coal distillation as a result of which the linings have disintegrated in spots. And even though the fracture or disintegration is confined to a small region it necessitates cooling and emptying the entire retort, and this consumes much time and large expense.

The principal objects of the present invention are to provide a silicon carbide lining for coal retorts and the like which has a high modulus of rupture at high temperatures and which will withstand the action of hot coal gases and other destructive substances. Corollarial objects are to provide a silicon carbide lining which is thoroughly vitrified throughout and which will retain its strength and inertness throughout a range of temperatures above the temperature at which the bond vitrifies.

The subject-matter of the invention is characterized as follows: The lining is constituted of substantially dust-free silicon carbide grains bonded together with a semi-refractory clay which is completely vitrified. The silicon carbide grains are preferably of the random sizes produced by crushing in the ordinary pan mills or of such sizes that the space not occupied by the grains is approximately one-fourth of the total volume, although for most installations this space may be anywhere within the range of 25 to 35 per cent. of the total volume. The proportion of vitrified bond is equivalent to that amount of unvitrified clay which, in dry volume, is approximately seven-eighths, or of the order of 80 to 95 per cent. of the aforesaid space not occupied by the silicon carbide grains, although in many cases satisfactory results may be obtained with any percentage within the range of 75 to 105. The clay has a vitrification range at least of the order of 100° C. and preferably as high as 150° C. That is the bond will withstand a temperature of 100° to 150° higher than the temperature at which vitrification begins.

With these characteristics the lining has a modulus of rupture at least of the order of twice that of the prior products above referred to and frequently the lining will withstand cross-breaking strains up to 5000 pounds per square inch, at a temperature of 1000° C. Moreover the lining is substantially inert to the action of the substances with which it comes in contact in coal distillation so that costly shut-downs for lining repairs is practically eliminated. By providing a wide vitrification range the lining will withstand temperatures in excess of the vitrification temperature, thereby enabling the material to be fired at a lower temperature than that at which it is to be subjected in use and providing a wide safety factor in respect to the retort temperatures. Moreover, the lining may be only partially vitrified in the process of manufacture, namely to the point where the bond has set and partially vitrified, and then completely vitrified in the normal operation of the retort, thereby reducing the time and cost of manufacture. The finished product is free from the dark central core frequently displayed by prior silicon carbide refractory linings and to this I attribute a part of its uniformly great strength.

Another factor contributing to the strength of the product is the dust-free character of the grains, since I have discovered that the strength is seriously diminished by the surface graphite and other dust always present in crushed silicon carbide for the following reasons. First, because the strength of the product depends in large part on the completeness with which the individual grains are wet with the bonding material, and the dust which coats and surrounds the grains prevents the fused bonding material from coming into intimate contact with the grains and adhering thereto. Second, because the voids are so small when the powdered graphite and dust are present, that they will not hold sufficient bonding material to make a strong product without forcing the grains of silicon carbide apart, which results in spaces filled with the bonding material and dust; a thick body of ceramic bond forms a much less strong union between the silicon carbide grains than a thin film. One way of eliminating the dust is mentioned hereinafter.

The clay should be plastic and smooth working. It should show partial vitrification at or about 1250° and should develop a dense vitrified mass at or about 1350° C. but should show no porosity due to evolution of gas at or about 1450°, that is, after apparent complete vitrification it should show substantially the same density over a temperature range of about 100° C. This clay may be fired at a temperature of 1300° C. to 1350° C. although intended for use at a temperature of 100° C. to 150° C. in excess of this.

In order to illustrate the nature of the invention and its application I have shown one concrete embodiment thereof in the accompanying drawings in which,—

Figure 1:
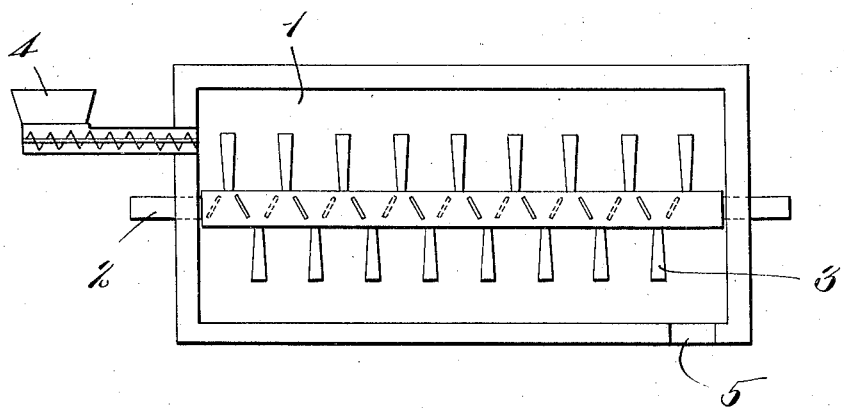
Figure 1 is a diagram showing the general arrangement of one type of continuous retort.

The particular application of the invention chosen for the purpose of illustration comprises a retort chamber 1, revolving axles 2 extending along the axes of the chamber ($x$ and $x'$, Fig. 2) and driven by means not shown, the axles carrying oblique vanes 3 for feeding the coal through the chamber, and means 4 for feeding the coal into the chamber, the chamber having an outlet 5 for discharging the residue.

Figure 2:
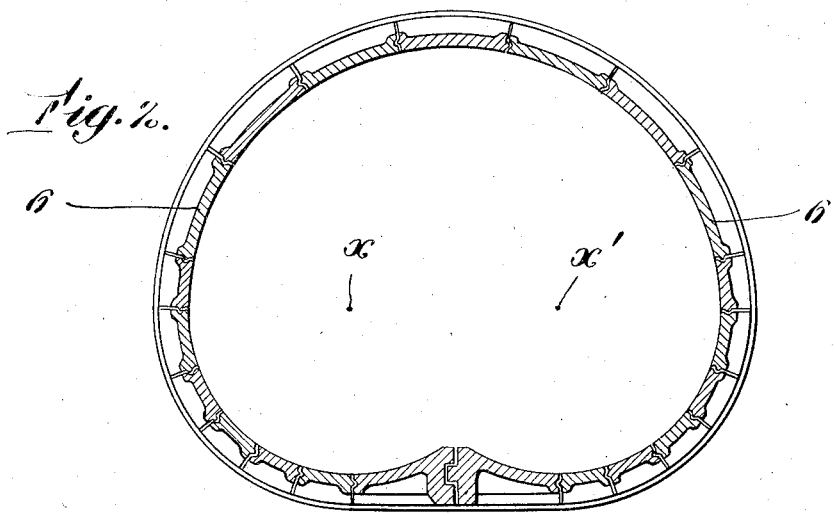
Figure 2 is a transverse section of the retort lining.
Figure 3:
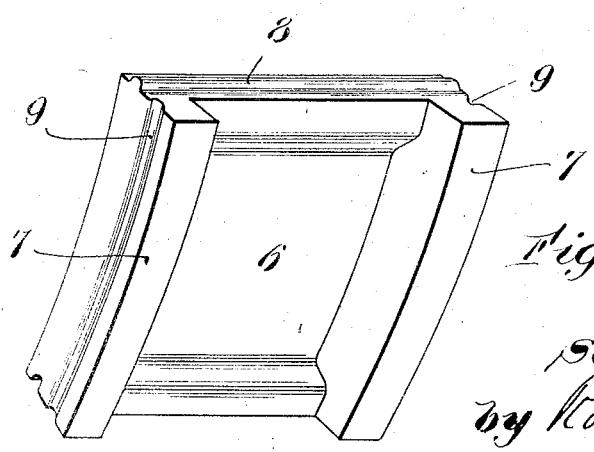
Figure 3 is a perspective view of a typical element of the retort.

The lining for the retort, shown in Fig. 2, preferably comprises a plurality of sections 6 of the general shape shown in Fig. 3. These sections have flanges 7 extending circumferentially of the retort to space the lining from the walls of the retort, the circumferential channels formed by the flanges constituting flues for the application of heat to the retort. The lining sections are also preferably provided with tongues 8 and grooves 9 so that they interfit.

In order more clearly to instruct how to produce the lining herein claimed I will now describe in detail one concrete procedure.

Crude silicon carbide as obtained from the electric furnace is crushed in a pan mill and passed over a 16 mesh grid. The product of the pan mill contains granular silicon carbide particles of random sizes, the upper limit of size being determined by the aperture of the grid. In addition to the silicon carbide grains the product contains silicon carbide flour, graphite, and other dust. The pan mill material is next thoroughly washed to remove foreign dust, graphite and such part of the silicon carbide as will readily float off under the conditions of energetic washing, with steam or air agitation, without undue loss of the desirable sizes of grain. The silicon carbide removed ranges from a few per cent. of the 100 mesh to 95 to 99 per cent. of the almost impalpable powder or flour such as would float in water for many minutes, but if approximately 95 per cent. of the graphite and flour is removed the resulting material is satisfactory for most purposes.

The washed mass of silicon carbide grains may be dried or the amount of water contained in it may be taken into account in adding water to mix with the bond.

I next mix the silicon carbide grains as above prepared with a certain amount of semi-refractory clay, temporary binder and water. The amount of clay used is of great importance. To determine the correct amount I first determine the percentage of voids or interstitial space in a carefully selected average sample of the silicon carbide to be used. This may vary from 25 to 35 per cent. depending upon the crystalline character of the particular furnace run of silicon carbide used, upon its purity, upon the condition and operation of the pan mill and upon the extent to which washing has been carried on. I use an amount of clay equivalent in dry volume to 85 per cent. of the free or void space in the sample of silicon carbide grains. With this clay I mix 6 per cent. water and one per cent. temporary organic binder, each by weight, figured on the combined weight of clay and silicon carbide. After thorough mixing, the mass is shaped by hand-tamping into moulds.

A clay having the desired vitrification range and the other necessary characteristics may be obtained by mixing, in the proportions indicated, the following clays:

Albany slip clay, approximately 15 per cent.; Kentucky ball clay, approximately 65 per cent.; Georgia plastic kaolin, approximately 20 per cent.

The articles prepared as above described are next dried so that they can be handled and are then loaded into the kiln in the usual manner and burned. The firing operation is carried on to such a point that every portion of every article reaches the vitrification range of temperatures and remains in this range of temperatures long enough to insure complete and homogeneous vitrification, which is very important. Owing to the long vitrification range of the clay used it is possible to use so high a kiln temperature as to insure complete vitrification without danger of overheating and spoiling any part of the material.

The product obtained by the above procedure shows a modulus of rupture as high as 5000 pounds per square inch at 1000° C. and averages well up to 4000 pounds. Its thermal conductivity is from 10 to 20 per cent. higher than that of the hitherto available commercial articles. It is remarkably impervious to gases. In commercial service in coal retorts it has stood up over long periods where silicon carbide products made by the hitherto known processes have failed.

I have found the use of a grain of the random sizes produced by crushing, and particularly by pan mill crushing, to give the maximum strength of product. The use of screened or sized grain, either wholly as a mixture of selected sizes or as an addition to pan mill material, gives no increase in strength, and usually a marked decrease; and the use of such sized grain is very expensive. Where unsalable sizes of grain are available they may be disposed of within reasonable limits by addition to the random size crushed material; but the use of a mixture of standard sized grains alone is unsatisfactory, unless the remixing be, in fact and substantially, a reconstituting of the original random size, by the compounding of all, or nearly all, of the sizes derived therefrom by screening, and in, or nearly in, the ratios by weight of the sizes so derived.

The shaping of the mass of silicon carbide, clay, water and binder can be carried out by any of the well-known methods such as hydraulic pressing, hand tamping, machine tamping, etc. I have found that careful hand tamping gives excellent results but any carelessness results in a weakened product, and if dependable labor is not available hydraulic pressing or machine tamping is advisable.

Instead of completely vitrifying the bond prior to its installation in the retort it may be only partially vitrified to the extent of rendering it self-supporting and then completely vitrified in the first operation of the retort.

I claim:

1. A lining for a retort comprising substantially dust-free silicon carbide grains bonded together with a vitrified semi-refractory clay, the dry volume of which before bonding is of a minimum 75% of the space not occupied by said grains and of a maximum substantially equal to said space in volume.

2. A lining for a retort comprising substantially dust-free random-sized silicon-carbide grains bonded together with a vitrified semi-refractory clay, the dry volume of which before vitrification is approximately seven-eighths of the space not occupied by the grains.

3. A lining for a retort comprising silicon-carbide grains of such sizes that the space not occupied by the grains is of the order of 25 to 35 per cent. of the total volume, the grains being bonded with vitrified semi-refractory clay, the dry volume of which before vitrification is not less than 75 per cent. of said space nor substantially greater than said space.

4. A lining for a retort comprising substantially dust-free random-sized silicon-carbide grains having such a size range that the space not occupied by the grains is approximately one-fourth of the total volume, the grains being bonded with vitrified semi-refractory clay, the dry volume of which before vitrification is approximately seven-eighths of said space.

5. A lining for a retort comprising substantially dust-free random-sized silicon-carbide grains having such a size range that the space not occupied by the grains is approximately one-fourth of the total volume, the grains being bonded with vitrified semi-refractory clay, the dry volume of which before vitrification is approximately seven-eighths of said space, and the vitrification range of which is at least of the order of 100° C.

Signed by me at Boston, Massachusetts. this 8th day of July, 1921.

SAMUEL F. WALTON.